E. F. DOUGLAS.
IRRIGATING CULTIVATOR.
APPLICATION FILED NOV. 27, 1909.

965,623.

Patented July 26, 1910.

WITNESSES:

INVENTOR
Elden F. Douglas
BY
ATTORNEYS

UNITED STATES PATENT OFFICE.

ELDEN FRANCIS DOUGLAS, OF WESKAN, KANSAS.

IRRIGATING-CULTIVATOR.

965,623.  Specification of Letters Patent.  Patented July 26, 1910.

Application filed November 27, 1909. Serial No. 530,122.

*To all whom it may concern:*

Be it known that I, ELDEN F. DOUGLAS, a citizen of the United States, and a resident of Weskan, in the county of Wallace and State of Kansas, have invented a new and Improved Irrigating-Cultivator, of which the following is a full, clear, and exact description.

This invention relates to a new and improved device for simultaneously irrigating and cultivating the soil in a new and improved manner.

An object of this invention is to provide a device which will be simple in construction, strong, durable, inexpensive to manufacture, easily operated, and easily adjusted.

A further object of this invention is to provide fluid pipes having earth-turning implements thereon adapted to be adjusted into the ground, with means for simultaneously controlling the flow of fluid through said pipes with the adjustment thereof.

These and further objects, together with the construction and combination of parts, will be more fully described hereinafter and particularly set forth in the claims.

Reference is to be had to the accompanying drawings forming a part of this specification, in which similar characters of reference indicate corresponding parts in both views, and in which—

Figure 1:
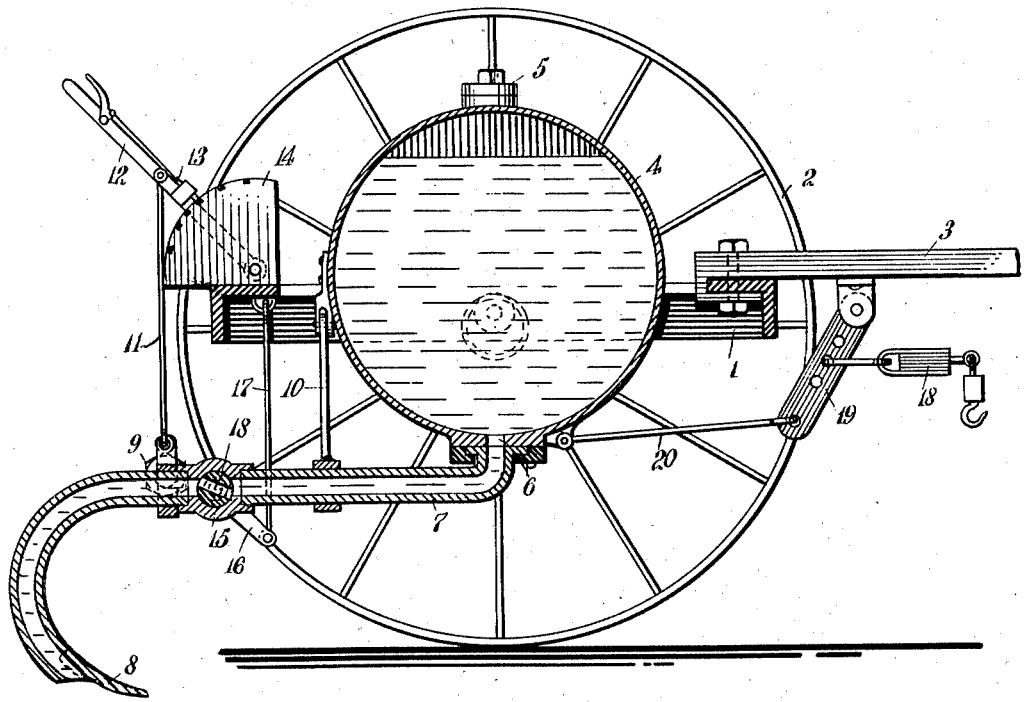
Figure 2:
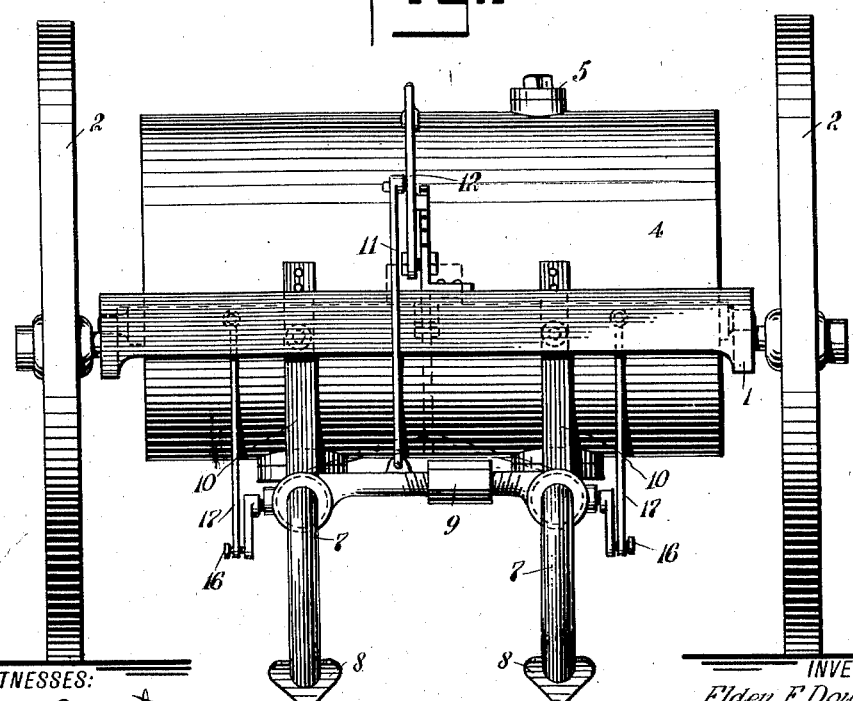

Figure 1 is a vertical section through the tank and one of the pipes leading therefrom; and Fig. 2 is a rear view in elevation.

Considering more particularly the separate parts of my invention, I provide a vehicle, which comprises a frame 1, which is supported on suitable wheels 2, whereby it may be drawn over the ground, and is further provided with a pole 3, to which suitable draft animals may be attached. The frame 1 is provided with a central opening, in which is pivotally secured a suitable tank or receptacle 4, which is for the purpose of containing and storing the fluid to be used in irrigating or fertilizing the ground. The tank 4 is provided with a removable cap 5 at the top thereof, whereby said tank may be filled with the fluid, and is also provided with a plurality of suitable openings 6 at the bottom thereof for distributing the fluid stored in the tank.

Pivotally connected adjacent the openings 6 and having internal passageways in alinement with the openings 6, there are provided a plurality of conduits or pipes 7, which are preferably hook-shaped, and have formed thereon in an integral manner, earth-turning implements or plows 8.

The pipes 7 have openings which are adapted to eject the fluid contained in the reservoir 4, directly back of the implements 8. The pipes 7 are pivotally connected to the tank 4, so that they may be adjusted relative thereto and relative to each other. For this purpose, they are interconnected by an adjustable turn-buckle 9. For additionally supporting the pipes 7 on the tank 4 in an adjustable manner, there are provided connecting links 10, which are pivotally connected to the tank 4 and the pipes 7.

Inasmuch as the tank 4 and the pipes 7 connected thereto are pivotally supported with respect to the frame 1, there must be some means of holding the tank and the pipes connected thereto in any adjusted position. For this purpose, there is provided a connecting link 11, which is pivotally connected to the turn-buckle 9 at one end, and to a lever 12 at the other end, that is pivoted to the frame 1 in any well known manner. The lever 12 is provided with a latch 13, which is adapted to engage in a notched sector 14, whereby the lever may be locked in any adjusted position, so as to lock the tank 4 and the pipes connected thereto in any adjusted position.

For the purpose of controlling the flow of fluid through the pipes 7, there is provided in each of these pipes, a valve 15. The valves 15 have connected thereto cranks 16, which are pivotally connected to links 17 supported by the frame 1. The valves 15 have passages 18 therein, which are so arranged that when the pipes 7 are lowered, the cranks 16 are thereby relatively raised, so that said passageways are brought in alinement with the passageways in the pipes 7, thus allowing the fluid to flow through the pipes 7 into the ground, when the plows 8 are in position ready to travel through the ground.

In order that the pull may be directly on the implements 8, so that they will force their way steadily through the ground, the draft animals are attached to a whiffletree 18, which is connected to a draft equalizer 19 pivotally secured at one end to the pole 3, and pivotally connected by a link 20 at the other end, to the tank 4.

The operation of the device will be readily understood when taken in connection with the above description. When it is desired to simultaneously cultivate and irrigate the ground, the tank 4 is supplied with a suitable fluid, which may or may not be of a fertilizing character, and the lever 12 adjusted so that the tank 4 will rotate the proper amount to dip the implements 8 and the pipes 7 connected thereto the desired distance into the ground. The vehicle is then drawn over the ground, the pull being exerted through the equalizer 19 on the lower portion of the tank 4, so that the implements 8 are positively forced into the ground, so as to turn and cultivate the same. As soon as the tank 4 is rotated relative to the frame 1 and the pipes 7 lowered, the valves 15 will be opened so as to permit the fluid in the tank 4 to exude behind the implements 8, so that the ground is irrigated or even fertilized at the same time that it is cultivated. The pipes 7 may be adjusted relative to each other, so as to allow for the separating of the lower ends thereof when it is desired to cultivate rows of plants of different widths.

Having thus described my invention, I claim as new and desire to secure by Letters Patent:—

1. In a device of the class described, the combination with a frame, of a tank supported on said frame, a pipe connected to said tank, an earth-turning implement connected to said pipe, means for adjusting said pipe to dig in the ground, and a valve in said pipe adapted to be operated by the adjustment of said pipe.

2. In a device of the class described, the combination with a frame, of a tank adjustably supported on said frame, a pipe connected to said tank, an earth-turning implement connected to said pipe, a valve in said pipe, a crank on said valve, and means for connecting said crank to said frame whereby the movement of said tank operates said valve.

3. In a device of the class described, the combination with a frame, of a tank adjustably supported on said frame, a pipe connected to said tank, a valve in said pipe, a crank connected to said valve, and means for keeping a portion of said crank at a constant distance from said frame.

4. In a device of the class described, the combination with a frame, of a tank connected to said frame, pipes connected to said tank, earth-turning implements connected to said pipes, means for adjusting said pipes relative to the frame, and means operated by the adjustment of said pipes for controlling the flow of fluid through said pipes.

5. In a device of the class described, the combination with a frame, of wheels for supporting said frame, a tank pivotally connected to said frame, pipes connected to said tank and adapted to swing therewith, earth-turning implements connected to said pipes, and draft mechanism connected to said tank beneath the pivot thereof.

6. In a device of the class described, the combination with a frame, of wheels for supporting said frame, a tank pivotally connected to said frame, pipes connected to said tank, earth-turning implements connected to said pipes, a pole connected to said frame, a draft equalizer connected to said pole and to said tank, and means for exerting a pull on said draft equalizer.

7. In a device of the class described, the combination with a frame, of a tank pivotally supported on said frame to swing vertically, a combined implement and pipe connected to said tank and adapted to be adjusted into the ground by the movement of said tank, a valve for controlling the flow of fluid through said pipe, a lever for operating said valve, and a member connecting said lever to said frame, whereby the movement of said tank and said pipe relative to said frame operates said valve.

8. In a device of the class described, the combination with a frame, of a tank pivotally connected to said frame to swing vertically, a combined implement and feeding pipe connected to said tank and movable therewith, a link connected to said combined implement and pipe, a lever connected to said link and pivotally supported on said frame, a sector secured to said frame, and a latch on said lever adapted to engage said sector to lock said combined implement and pipe and said tank in any adjusted position.

9. In a device of the class described, the combination with a frame, of a tank, and a combined earth-turning and fluid-conducting pipe secured to said tank, said tank being pivotally connected to said frame to swing vertically, thereby controlling the vertical adjustment of said pipe, and said pipe being rotatably supported by said tank to allow for transverse adjustments of said pipe.

10. In a device of the class described, the combination with a frame, of a tank pivotally connected to said frame to swing vertically, a plurality of pipes rotatably supported in the bottom of said tank and having earth-turning implements integrally formed therewith, a turn-buckle connecting said pipes and adapted to adjust said pipes, and means for adjusting said tank and said pipes simultaneously.

11. In a device of the class described, the combination with a frame, of a tank pivotally connected to said frame to swing vertically, a plurality of pipes rotatably supported in the bottom of said tank and having earth-turning implements integrally formed therewith, a turn-buckle connecting said pipes and adapted to adjust said pipes relative to each other, means for adjusting said tank and said pipes simultaneously, a valve in each of said pipes for controlling the flow of fluid through each of said pipes, and means for connecting said valves to said frame, whereby the movement of said tank relative to said frame controls the operation of said valves.

In testimony whereof I have signed my name to this specification in the presence of two subscribing witnesses.

ELDEN FRANCIS DOUGLAS.

Witnesses:
J. A. SHRIVER,
R. L. BEAMAN.